INVENTOR
EUGENE HOO

INVENTOR.
EUGENE HOO
BY Moody and Phillips

ATTORNEYS

United States Patent Office 3,488,598
Patented Jan. 6, 1970

3,488,598
CLOSED LOOP CONTROL SYSTEM EMPLOYING A-C AMPLIFICATION OF D-C ERROR CORRECTING SIGNALS
Eugene Hoo, Newport Beach, Calif., assignor to Collins Radio Company, Cedar Rapids, Iowa, a corporation of Iowa
Filed Nov. 13, 1962, Ser. No. 236,981
Int. Cl. H03b 1/00
U.S. Cl. 328—163      12 Claims This invention relates generally to control circuits and, more specifically, it relates to a circuit means for causing a D-C error signal to approach zero in a closed loop control circuit.

In electronic circuits there are many instances where a closed loop control circuit is required. For example, when frequency errors arise due to the Doppler effect, it is often necessary to correct the frequency of the incoming signal to correspond with some reference, or standard frequency. To accomplish the foregoing, the incoming signal can be supplied to a frequency discriminator which has been tuned to the standard frequency. Any deviation of the input signal frequency from the standard frequency results in a D-C error signal being generated by the frequency discriminator. Such D-C error signal can be utilized, for example, to control the output signal frequency of a variable controlled oscillator, which output signal can then be mixed with the received input signal to correct the frequency of said input signal to a desired value. Other uses of closed loop control circuits occur in many servo mechanism applications where the error to be corrected may be in the form of a mechanical adjustment as, for example, the airfoils on an airplane.

In many cases where a close loop control circuit is employed, it is desired to provide as much correction of the error as is possible. Since the error to be corrected usually is represented by the magnitude of the error signal, the degree of correction of the error is inversely proportional to the magnitude of the error signal. One of the more common ways of processing the error signal to obtain a high degree of correction is to both amplify and integrate the error signal. Amplification of the error signal functions to provide relatively quick correction of the error, or at least provide at the output of the amplifier an immediate response to any change in the error signal. However, after adjustment of the error has been made as a result of the amplified signal there must remain some error signal in order to maintain stability in the loop. In other words, the error can never be removed completely since complete removal of error implies a reduction of the error signal to zero value. The integrating means operates over a longer time interval than the amplifier in the feedback control loop and functions to integrate even a small error signal until an appreciable signal is developed at the output of the integrator. Such signal is then supplied to the control means which functions to make the necessary adjustments in the controlled circuit or mechanism. By means of such integration circuits the D-C error signal can be made to approach zero value much more closely than with an amplifier means alone. Since the magnitude of the D-C error signal is indicative of the amounts of error in the circuit being controlled, it follows that the amount of error is also decreased to a very small value.

In the prior art, however, where such error signals are D-C in nature, it has been customary to employ D-C integrators. However, the use of D-C integrators presents certain inherent problems. More specifically, D-C integrators are inherently unstable and somewhat difficult to design. Another unfavorable factor is the large size of D-C integrators caused primarily by the necessary use of rather large capacitors.

An object of the present invention is to provide an A-C integrating means which will function to integrate D-C signals.

Another object of the invention is to provide a combined amplifier and integrator circuit which functions to amplify and integrate D-C signals which are first converted into A-C form.

A further purpose of the invention is to provide a circuit means which will convert a D-C error signal into an A-C signal, then integrate the A-C signal, and then convert said integrated A-C signal back into a D-C signal.

A fourth aim of the invention is the improvement of circuits for enhancing D-C error signals, generally.

In accordance with the invention there is provided in combination with a closed loop control circuit for controlling a controllable means and including a D-C error signal generating means, a circuit means for amplifying the D-C error signal and for integrating said D-C error signal to produce a resultant D-C error signal whose magnitude is determined both by said amplifying means and said integrating means. The aforementioned circuit means includes means for converting the D-C error signal into an A-C signal for amplification and integration purposes. Said amplifying means and integrating means are arranged in parallel with each other with respect to the source of the D-C signal error. Signal combining means are provided to combine the output signals from the amplifying means and the integrating means to produce the resultant enhanced D-C error signal. The enhanced D-C error signal is then employed to adjust or control the said controllable means.

In accordance with a feature of the invention, the integrating circuit is comprised of means for converting the D-C error signal into an A-C signal, a resonator means, positive feedback means connecting the output terminal of the resonator to the input terminal of the resonator, and other means for converting the output of said resonator back into a D-C signal whose amplitude is proportional to the amplitude of the A-C signal produced at the output of said resonator.

It is to be noted that the integrating portion of the invention may be employed by itself without an amplifier being connected in parallel therewith. Thus, the integrating circuit constitutes a subcombination of the present invention.

The above noted and other objects and features of the invention will be more clearly understood from the following detailed description thereof when read in conjunction with the drawings in which.

Figure 1:
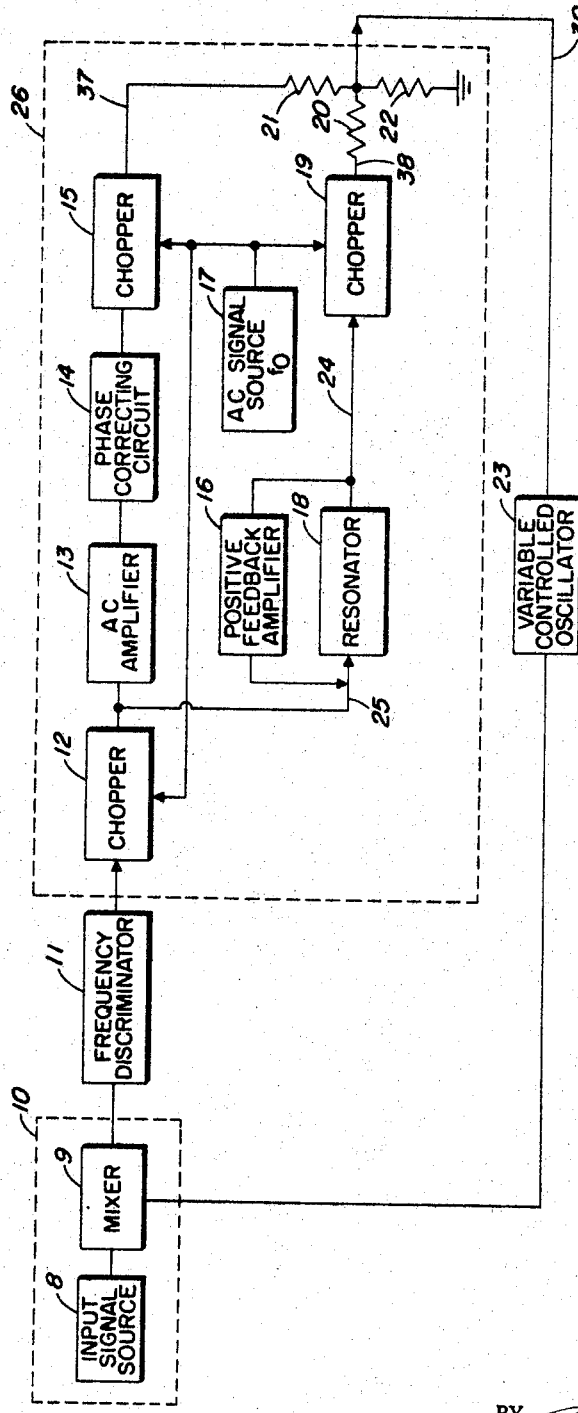
FIG. 1 shows a block diagram of the invention.

Referring now to FIG. 1, there is shown the invention in combination with a frequency correcting circuit. The invention is so shown because a better understanding of the invention is thereby obtained.

Specifically, the inventive portion of the circuit of FIG. 1 is contained within the dotted block 26 with the blocks 8, 9, 11, and 23 providing the frequency correcting circuit in which amplifier integrator means is employed. Input signal source 8 may be a receiver means which supplies a received signal to the mixer 9. If the frequency of the signal supplied to the mixer 9 deviates from a predetermined value, the frequency discriminator 11 responds thereto to produce a D-C error signal which is indicative of the degree and direction of such frequency deviation and which is supplied to circuit 26. The circuit 26 functions to enhance the D-C error signal and then supply such enhanced error signal to the variable controlled oscillator 23. The variable controlled oscillator 23 responds thereto to produce an output signal having a frequency which, when mixed with the frequency of the input signal from source 8 in mixer 9, will correct the frequency of the signal supplied to the discriminator 11 to said predetermined value.

Figure 3:
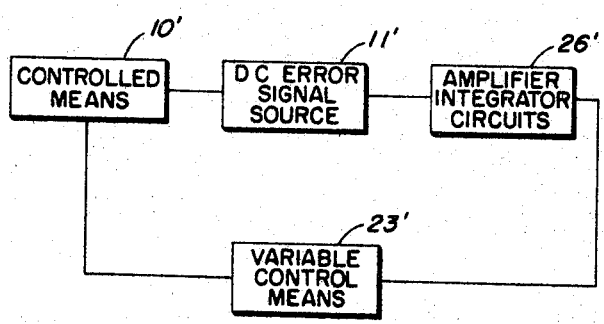
FIG. 3 shows a block diagram of a general application of the invention.

It is to be understood, however, that the circuit within the block 26 can be used in many other applications. The more general form of the invention is shown in block diagram of FIG. 3 wherein the variable control means 23' could be any control means, such as a servo motor, for example. The means which is controlled is represented by the block 10' and could be a mechanical means as, for example, an aileron on an airplane. Block 10' corresponds generally to block 10 of FIG. 1. The D-C error signal source 11', which corresponds to the frequency discriminator 11 of FIG. 1, can be any means which responds to a particular condition of the controllable means 10' to produce an error signal indicative of said particular condition of said controlled means.

As indicated above, in FIG. 1, a D-C error signal will appear at the output terminal of the frequency discriminator 11' when the frequency of the input signal varies from the center tuned frequency of the discriminator. To correct for such frequency difference, the D-C error signal is enhanced by the circuit 26 and then supplied to the variable controlled oscillator 23 which responds thereto to produce an output signal having a frequency which, when mixed with the frequency of input signal from source 28, will produce a signal having the corrected frequency.

The D-C error signal from the discriminator 11 is supplied to a chopper 12 which is energized by the output signal of A-C signal source 17 having a frequency $f_0$. It should be noted that the output signal of A-C signal source 17 also activates choppers 15 and 19 so that the operation of all three choppers 12, 15, and 19 are synchronized. The output signal of chopper 12 is supplied to two parallel circuits; one parallel circuit comprising the A-C amplifier 13, phase-correcting circuit 14, and chopper 15, all arranged in cascade. The other parallel circuit comprises the series arrangement of resonator 18, which has a positive feedback circuit 16, and chopper 19.

Resonator 18 and positive feedback circuit 16 form an A-C integrating circuit which operates essentially as follows. The resonator 18 is tuned to the same frequency $f_0$ as the applied input signal (from chopper 12) and responds thereto to build up a resonant signal whose amplitude is proportional to the amount of energy of the input signal supplied thereto. In order to compensate for losses in the resonator 18, the positive feedback circuit 16 is provided. It should be noted that the positive feedback circuit 16 should only compensate for losses in the resonator and should not form an oscillatory system. The resonator 18 can be a mechanical resonator comprised of vibrating dics or a crystal, for example, or the resonator 18 can be of electrical constants. In the case where a crystal is employed, it is possible that a positive feedback circuit might not be required since the loss in some crystal resonating circuits is quite small.

Both choppers 15 and 19 function to convert the A-C signals which are supplied to their input terminals from phase correcting circuit 14 and resonator 18, respectively, into D-C signals. Such D-C signals are added together in an adding circuit comprised of resistors 20, 21, and 22 to produce a resultant D-C signal on the output lead 30.

Figure 2:
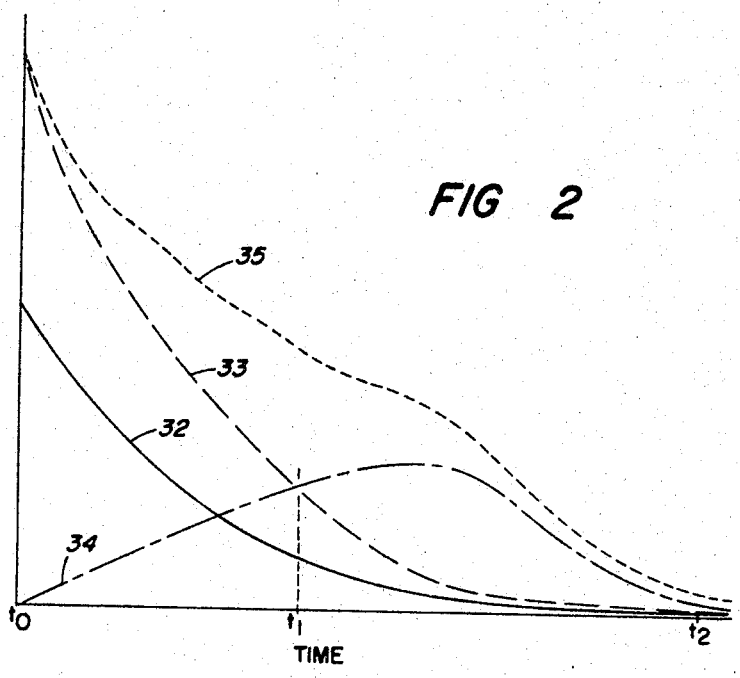
FIG. 2 shows curves of the various D-C signals produced in the circuit of FIG. 1 as a correction of the controllable means is made.

In FIG. 2 there are shown four curves which represent the D-C voltages at four different points in the circuit of FIG. 1. More specifically, waveform 32, represents the original D-C error signal appearing at the output of D-C error signal source 11, i.e., the frequency discriminator 11. Assume that such error signal (curve 32) first appeared in the circuit at time $t_0$. The curve 33 represents the D-C signal appearing at the output of chopper 15 after the output of chopper 12 is amplified by amplifier 13 and phase corrected by phase correcting circuit 14. It should be noted that the purpose of the phase correcting circuit 14 is to compensate for any phase shift caused by amplifier 13, or other portions of the circuit, thus insuring that the chopper 15 will properly convert the A-C signal back into a D-C signal.

The output from the integrator circuit, which includes resonator 18 and feedback circuit 16 appears at the output of chopper 19, and at time $t_0$, will be zero volts since a finite time is required for the signal in the resonator to build up to a finite value. The curve 34 of FIG. 2 represents the D-C signal appearing on the output lead 38 of chopper 19. Curve 35 represents the sum of the D-C voltages of curves 33 and 34 and appears on the output lead 30 of FIG. 1. It will be observed that during the initial portion of the correction time interval, the output voltage curve 35 is dominated by the signal represented by curve 33. However, as the time interval grows longer the actual D-C error voltage, as shown by the curve 32, becomes less with a consequent decrease in the output of the chopper 15. However, the D-C voltage generated by the integrating circuit of FIG. 1, steadily increases from the time $t_0$ and at the time $t_1$ becomes the dominating correcting voltage as can be seen in FIG. 2. Thus, the effective D-C correcting voltage, as represented by curve 35, is considerably greater than the output of the chopper 15 of FIG. 1 and extends over a much greater period of time. At about time $t_2$ the circuit becomes stabilized with small D-C output voltages from the chopper 15 and the chopper 19. Such small D-C error voltage will remain about the same until some change is made in the controlled means as, for example, a change in the Doppler frequency.

The center tuned frequency of the resonator 18 is selected to be the same as the frequency of the A-C signal source 17 so there will be substantially no phase shift introduced by the resonator 18. Thus, no phase correcting circuit ordinarily is required in the integrator portion of the circuit. However, should there be some phase shift it is understood that a phase correcting circuit could be inserted, for example, between resonator 18 and the chopper 19. As indicated above, the function of chopper 19 is to reconvert the A-C output signal of the resonator 18 back into a D-C signal. Such reconverting can be accomplished since the choppers 12 and 19 are both energized from the same A-C signal source 17, thus insuring a constant phase relationship between the output signal of the resonator 18 and the duty cycle of the chopper 19.

It is to be noted that the forms of the invention shown and described herein are but preferred embodiments thereof and that various changes may be made in circuit arrangement and in the circuit components employed therein without departing from the spirit or the scope of the invention.

I claim:

1. Means for integrating a D-C input signal comprising first converting means for converting said D-C input signal into a first A-C signal with a frequency $f$ and an amplitude proportional to the amplitude of said D-C input signal, resonator means tuned to the frequency $f$ and constructed to produce, in response to said first A-C signal, an output A-C signal whose amplitude represents the accumulated energy of said first A-C signal, second converting means for converting said second A-C signal back into a D-C signal whose amplitude is proportional to the amplitude of said second A-C signal.

2. Integrating means in accordance with claim 1 comprising a positive feedback means for supplying the output A.C. signal from said resonator back into the input of said resonator to provide a linear relationship between the increase in amplitude of said output of A.C. signal and the energy contained in said first A.C. signal with respect to time.

3. Integrating means in accordance with claim 2 in which said resonator means comprises a mechanical resonating means.

4. Integrating means in accordance with claim 1 in which said first and second converting means comprises first and second chopper circuits, respectively.

5. Integrating means in accordance with claim 4 comprising an A.C. amplifier means constructed to amplify the output of said first chopper means, third chopper means having an operating frequency of $f$ and constructed to convert the output of said A.C. amplifier means back to a D.C. voltage, and a signal combining network constructed to combine the output signals of said third and second chopper means.

6. Integrating means in accordance with claim 5 comprising a positive feedback means for supplying the output A.C. signal from said resonator back into the input of said resonator to provide a linear relationship between the increase in amplitude of said output of A.C. signal and the energy contained in said first A.C. signal with respect to time.

7. Integrating means in accordance with claim 6 in which said resonator means comprises a mechanical resonating means.

8. Integrating means in accordance with claim 7 in which said first and second converting means comprise first and second chopper circuits, respectively.

9. In combination with a closed loop control means including controllable means, a D.C. error signal source means constructed to produce a D.C. error signal when said controllable means decreases from a predetermined condition and variable control means responsive to an error signal supplied thereto to control said controllable means, a D.C. error signal enhancing means responsive to the output of said D.C. error signal source to produce an enhanced D.C. signal which is supplied to variable control means, said D.C. error signal enhancing means comprising first converting means for converting said D-C input signal into a first A-C signal with a frequency $f$ and an amplitude proportional to the ampitude of said D-C input signal, resonator means tuned to the frequency $f$ and constructed to produce, in response to said first A-C signal, an output A-C signal whose amplitude represents the accumulated energy of said first A-C signal, second converting means for converting said second A-C signal back into a D-C signal whose amplitude is proportional to the amplitude of said second A-C signal.

10. Integrating means in accordance with claim 9 comprising a positive feedback means for supplying the output A.C. signal from said resonator back into the input of said resonator to provide a linear relationship between the increase in amplitude of said output of A.C. signal and the energy contained in said first A.C. signal with respect to time.

11. Integrating means in accordance with claim 10 in which said resonator means comprises a mechanical resonating means.

12. Integrating means in accordance with claim 11 in which said first and second converting means comprise first and second chopper circuits, respectively.

References Cited

UNITED STATES PATENTS

| 2,681,952 | 6/1954 | Gilbert | 328—127 |
| 2,806,989 | 9/1957 | Shoup | 321—2 |
| 2,923,889 | 2/1960 | Salter | 328—127 |
| 3,018,391 | 1/1962 | Lindsay et al. | 307—88.5 |
| 3,121,221 | 2/1964 | Sullivan | 331—17 XR |

RODNEY D. BENNETT, JR., Primary Examiner

D. C. KAUFMAN, Assistant Examiner

U.S. Cl. X.R.

307—229, 261; 321—2; 328—127